G. JOHNSON.

Hats.

No. 5,188.

Reissued Dec. 17, 1872.

Witnesses.

Wm R Wright
Thos A. Burtt

Inventor.

George Johnson
by his attorney
G. Harding

UNITED STATES PATENT OFFICE.

GEORGE JOHNSON, OF PHILADELPHIA, PENNSYLVANIA.

IMPROVEMENT IN HATS.

Specification forming part of Letters Patent No. 110,570, dated December 27, 1870; reissue No. 5,188, dated December 17, 1872.

*To all whom it may concern:*

Be it known that I, GEORGE JOHNSON, of the city and county of Philadelphia, in the State of Pennsylvania, have invented a new and useful Improvement in Hats; and I do hereby declare the following to be a full, clear, and exact description thereof, which will enable others skilled in the art to which it appertains to make and use the same, reference being had to the accompanying drawing which forms a part of this specification.

The said invention consists in a hat-body made of an open woven fabric of strips or splits of wood saturated or coated with shellac or other water-proof gum, and covered as hereinafter described.

The material of the hat-body is an open woven fabric or strips of wood, both warp and woof. The mesh may be contracted or enlarged at pleasure. The strips of the fabric may also be varied in width, density of fiber, or thickness. I prefer, however, for practical use, a fabric which is woven with a uniform warp and woof, and an equality of mesh, the whole system being based upon the principle of keeping the fabric open, to afford free ventilation.

I propose to use the open woven fabric thus described for the manufacture of hat-bodies, the same to be covered with plush, silk, or such suitable material as the judgment of the manufacturer may select.

Figure 1:
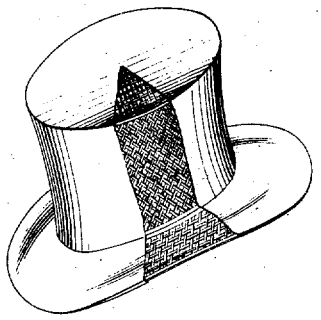
Figure 2:
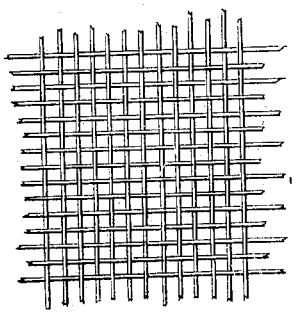
Figure 3:
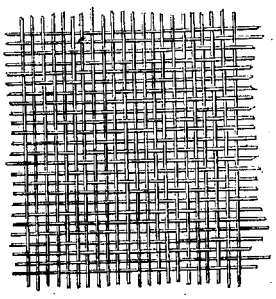

Figure 1 of the drawing is a profile view of the manufactured hat, covered with plush or other material, a portion of which is removed to show the open woven fabric beneath, and which is cut diagonally for the side crown. This shows, further, the tip of similar fabric, and the brim of closer or heavier material, and the joints of the tip, side crown, and brim. Fig. 2 is an enlarged view of the open woven material used for the side crown and tip. Fig. 3 shows a somewhat thicker or heavier fabric, analogous in character, which may be used for the brim.

I do not, however, confine myself to a fabric woven precisely as shown in the drawing, with the slips crossing each other at right angles, as I propose, if desirable, to use the same material woven differently—"twilled," for example—or as I may find expedient.

The method of manufacture which I prefer is as follows: Having saturated the wooden fabric for the side crown with shellac or other water-proof gum, (either by immersion or brushing on,) I cut the proper length to fit the block, close the joint with a slight lap covered with a strip of gummed muslin, slipping the block in as is done in blocking an ordinary gossamer crown. The tip is then put on in the usual way, with a strip or robin of gummed muslin around the square. Tarlatan or Swiss mull or bobbinet or other similar fabric is then attached to the entire inside or outside, or to both, and the brim is put on in the usual way. The body is then varnished, and a cover of silk, plush, cloth, or other material is attached to the entire body by pressing it on with a hot iron or by the use of a solution of gum.

I am well aware that hair, wire, grass, straw, basswood chips, palm leaf, or Brazilian chips and other vegetable fibers of a like nature, have been used in the manufacture of hat-bodies, and I hereby disclaim the use of them, either plaited or woven.

What I claim as my invention, and desire to secure by Letters Patent of the United States, is—

A hat-body, made of an open woven fabric of strips or splits of wood, and saturated or coated with shellac or other water-proof gum, substantially as described.

A hat-body, made of an open woven fabric of strips or splits of wood, the side crown of which is covered either within or without, or on both sides, with tarlatan, bobbinet, or similar fabric, attached thereto by shellac or other water-proof gum, substantially as described.

A hat-body, made of an open woven fabric of strips or splits of wood, and having a cloth or other suitable cover attached directly to the entire body by shellac or other water-proof gum.

GEORGE JOHNSON.

Witnesses:
I. I. BUCHEY,
THOS. A. BURTT.